(12) United States Patent  (10) Patent No.: US 6,590,721 B2
Onda  (45) Date of Patent: Jul. 8, 2003

(54) LENS SUPPORT STRUCTURE

(75) Inventor: Kazuhiko Onda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/103,969

(22) Filed: Mar. 25, 2002

(65) Prior Publication Data

US 2002/0141079 A1 Oct. 3, 2002

(30) Foreign Application Priority Data

Mar. 29, 2001 (JP) ........................................ 2001-096240

(51) Int. Cl.[7] ............................ G02B 7/02; G03B 17/26; G03B 21/14; F21V 17/00
(52) U.S. Cl. ........................ 359/819; 396/526; 362/455; 353/100
(58) Field of Search ................................. 359/818, 819; 396/526; 362/455; 353/100

(56) References Cited

U.S. PATENT DOCUMENTS

| 5,117,311 A | * | 5/1992 | Nomura ........................ 359/819 |
| 5,177,641 A | * | 1/1993 | Kobayashi et al. ......... 359/820 |
| 5,808,817 A | * | 9/1998 | Miyamoto et al. .......... 359/819 |
| 6,369,960 B2 | * | 4/2002 | Azegami ....................... 359/819 |

FOREIGN PATENT DOCUMENTS

JP  7-113937  5/1995

* cited by examiner

Primary Examiner—Loha Ben
Assistant Examiner—William Choi
(74) Attorney, Agent, or Firm—Leydig, Voit & Mayer, Ltd.

(57) ABSTRACT

A lens support structure includes a tubular holding frame a flat holding surface orthogonal to a center axis of the frame, and a lens held within the holding frame with a planar part, orthogonal to the optical axis of an optically functioning surface, abutting the holding surface. Since the planar part of the lens abuts the flat holding surface, the lens can be moved in directions orthogonal to the optical axis to enable optical axis adjustment.

4 Claims, 2 Drawing Sheets

LENS SUPPORT STRUCTURE

BACKGROUND OF THE INVENTION

1. Field of the Invention

The present invention relates to a lens support structure for supporting lenses used in a lens optical system of a camera and the like.

2. Related Background Art

Conventionally known as a lens support structure for supporting lenses is one arranging a plurality of lenses within a lens barrel so as to secure and support them as disclosed in Japanese Patent Application Laid-Open No. HEI 7-113937. The lens support structure disclosed in the above-mentioned publication is one inserting a plurality of lenses into a lens barrel in a stacking fashion, adjusting the optical axis of each lens, injecting a filler between the peripheral face of the lenses and the inner face of the lens barrel thereafter, and curing the filler so as to secure the lenses to the lens barrel.

However, the above-mentioned lens support structure may be problematic in that the optical axis adjustment of lenses is difficult. For example, as shown in FIG. 2, when a plurality of lenses 101, 102, and 103 are inserted into a lens barrel 100 in a stacking fashion, curved surfaces of the lenses 101 to 103 come into contact with each other. When adjusting the optical axis of the lens 101 by pressing the lens 101 sideways with pins 104, the lens 101 moves along a curved lens surface, thereby not only traveling in directions orthogonal to the optical axis but also tilting as indicated by arrows in FIG. 2, whereby the optical axis $O_{101}$ of the lens 101 inclines with respect to the optical axis O of the lens barrel 100. As a consequence, the optical axis adjustment of the lens 101 may not be carried out accurately.

SUMMARY OF THE INVENTION

In order to overcome such a problem, it is an object of the present invention to provide a lens support structure which can carry out appropriate axis adjustment.

For achieving such an object, the lens support structure in accordance with one aspect of the present invention is a lens support structure comprising: a first lens; a second lens; a spacer ring for separating the second lens from the first lens; and a tubular holding frame for accommodating the fist lens and the second lens, wherein the holding frame has a flat first holding surface orthogonal to a center axis thereof; wherein the first lens has an optically functioning part and is formed with a first planar part orthogonal to an optical axis of the optically functioning part, the first lens being accommodated within the holding frame with the first planar part abutting against the first holding surface; further wherein the spacer ring is formed with a flat second holding surface orthogonal to a center axis thereof, the spacer ring being attached to an outer periphery of the first lens such that the second holding surface faces the second lens; and still wherein the second lens has an optically functioning part and is formed with a second planar part orthogonal to an optical axis of the optically functioning part, the second lens being accommodated within the holding frame with the second planar part abutting against the second holding surface.

The lens support structure in accordance with another aspect of the present invention is characterized in that the holding frame is formed with a through hole penetrating through a peripheral face thereof at a position outside the spacer ring.

The lens support structure in accordance with still another aspect of the present invention comprises latching means for latching the second lens by pressing the second lens toward the spacer ring; wherein the second lens is held as being pressed against the second holding surface by the latching of the latching means; and wherein the first lens is held as being pressed against the first holding surface by the latching of the latching means by way of the second lens and spacer ring.

The lens support structure in accordance with still another aspect of the present invention is characterized in that the latching means is formed by inwardly deforming an end part of the holding frame.

According to these aspects of the present invention, the first planar part of the first lens is caused to abut against the first holding surface of the holding frame, and the second planar part of the spacer ring is caused to abut against the second planar part of the second lens, whereby the first lens can easily be moved in directions orthogonal to the optical axis together with the spacer ring along the first holding surface and second planar part. Therefore, when the outer peripheral part of the first lens is pushed with a pin and the like at the time of making, for example, the first lens can be moved in directions orthogonal to the optical axis, so as to enable appropriate optical axis adjustment without generating postural shifts in the first lens such as tilts with respect to the optical axis.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
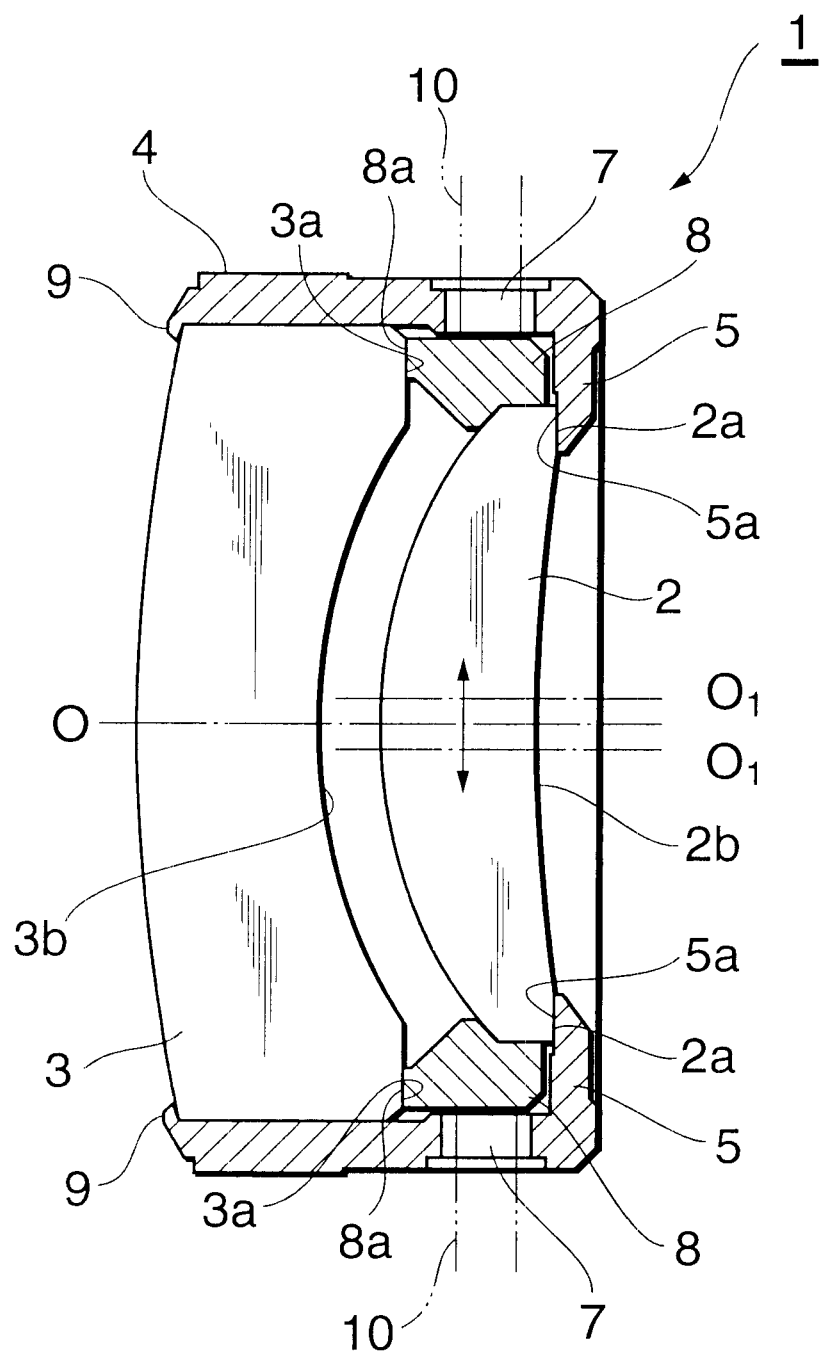
FIG. 1 is an explanatory view of the lens support structure in accordance with an embodiment of the present invention.
Figure 2:
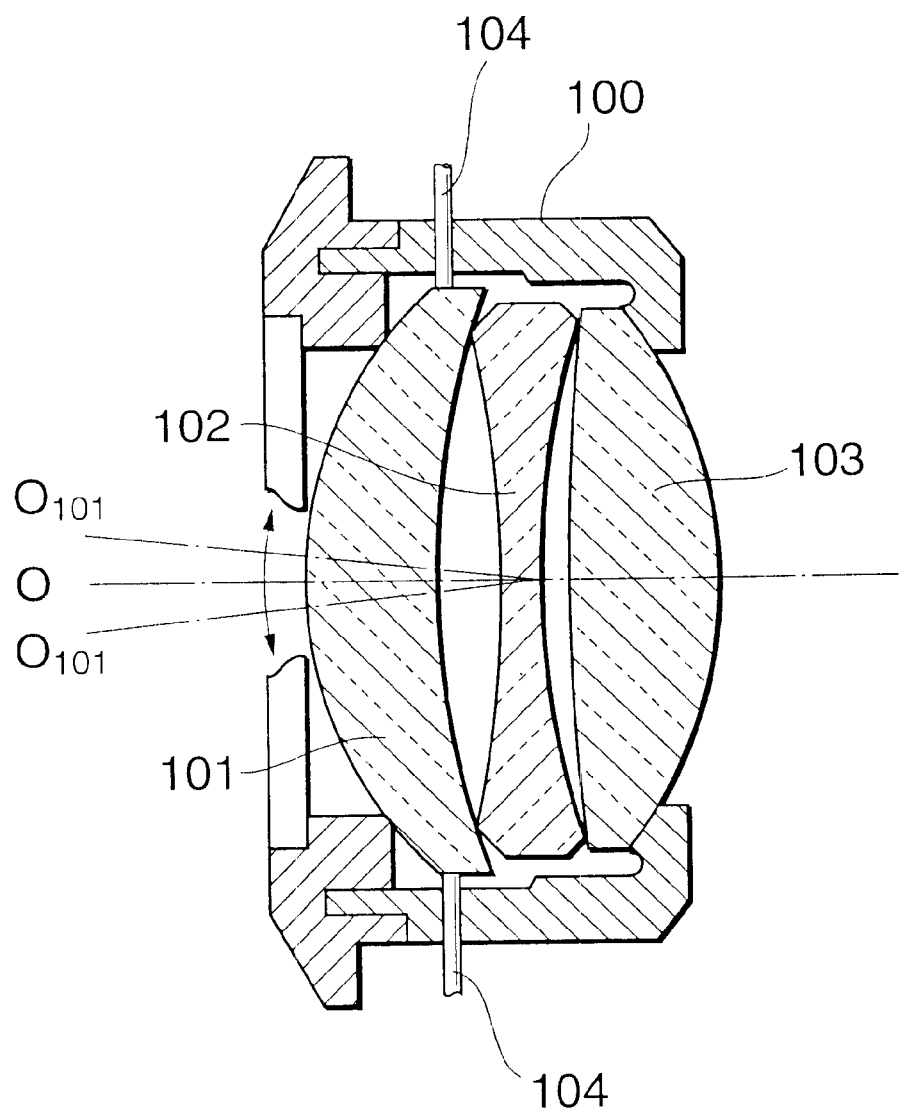
FIG. 2 is an explanatory view of prior art.

In the following, embodiments of the present invention will be explained with reference to the drawings. Among the drawings, constituents identical to each other will be referred to with numerals or letters identical to each other without repeating their overlapping descriptions. Also, ratios of dimensions in the drawings do not always match those explained.

FIG. 1 shows an explanatory view of the lens support structure in accordance with an embodiment. As depicted, the lens support structure in accordance with this embodiment is employed in a lens barrel 1 having a first lens 2 and a second lens 3, and is used for supporting the first lens 2 and second lens 3 constituting a lens optical system of a camera.

The first lens 2 and second lens 3 are accommodated within a holding frame 4 and held thereby. The holding frame 4 is a tubular body having both ends open, whereas one end thereof is formed with a holding part 5. The holding part 5 holds the first lens 2 by latching the same, and is formed so as to project from the inner peripheral face of the holding frame 4 toward the center.

The holding part 5 is formed with a flat holding surface 5a orthogonal to the center axis of the holding frame 4. The holding surface 5a is a surface for holding the first lens 2. The "center axis" of the holding frame 4 refers to an axis passing through the center of the holding frame 4 having a tubular form.

The peripheral face of the holding frame 4 is formed with through holes 7. Each through hole 7 penetrates through the peripheral face of the holding frame 4 and is used when adjusting the optical axis of the first lens 2. The through hole 7 is formed at a position outside a spacer ring 8 which will be explained later. A plurality of through holes 7 are formed at predetermined intervals along the periphery of the holding frame 4.

The first lens 2 is formed with a planar part 2a. The planar part 2a is formed by flattening the outer peripheral part of an optically functioning surface 2b formed like a curved surface. The planar part 2a is formed orthogonal to the optical axis $O_1$ of the optically functioning surface 2b. The first lens 2 is arranged such that the planar part 2a abuts against the holding surface 5a.

A spacer ring 8 is attached to the outer periphery of the first lens 2. The spacer ring 8 is a ring member functioning as a spacer for separating the first lens 2 and second lens 3 held within the holding frame 4 from each other while supporting the first lens 2. The spacer ring 8 is formed such that its outer diameter is smaller than the inner diameter of the holding frame 4.

A surface of the spacer ring 8, orthogonal to the center axis thereof, facing the second lens 3 is formed with a flat holding surface 8a. The spacer ring 8 is attached to the first lens 2 such that its center axis aligns with the optical axis $O_1$ of the first lens 2. The "center axis" of the spacer ring 8 refers to the axis passing through the center of the spacer ring 8 having a ring form.

The second lens 3 is formed such that its outer diameter is substantially the same as the inner diameter of the holding frame 4 so as to fit just in the holding frame 4. The second lens 3 is formed with a planar part 3a. The planar part 3a is formed by flattening the outer peripheral part of an optically functioning surface 3b formed like a curved surface. The planar part 3a is formed orthogonal to the optical axis of the optically functioning surface 3b. The second lens 3 is arranged such that the planar part 3a abuts against the holding surface 8a of the spacer ring 8.

An end part of the holding frame 4 is formed with a latching part 9. The latching part 9 is a latching means for latching the second lens 3 by pressing it toward the spacer ring 8, and is formed by inwardly deforming the end part of the holding frame 4.

The making of the lens barrel 1 and the optical axis adjustment by employing the lens support structure in accordance with this embodiment will now be explained.

In FIG. 1, when making the lens barrel 1, the spacer ring 8 is initially attached to the outer periphery of the first lens 2. The spacer ring 8 is firmly attached to the first lens 2 by adhesion, press-fitting, and the like.

Subsequently, the first lens 2 having the spacer ring 8 attached thereto is accommodated in the holding frame 4, and the first lens 2 is arranged such that the planar part 2a of the first lens 2 abuts against the holding surface 5a of the holding frame 4. Then, the second lens 3 is arranged so as to be accommodated in the holding frame 4 while the planar part 3a of the second lens 3 abuts against the holding surface 8a of the spacer ring 8.

Here, the second lens 3 is attached to the holding frame 4 so as to fit therein, and is firmly secured thereto without play. On the other hand, the first lens 2 is accommodated while being movable together with the spacer ring 8 in directions orthogonal to the optical axis O of the lens optical system (the center axis of the holding frame 4).

In this state, adjustment pins 10, which are manufacturing jigs, are inserted into the through holes 7. As the adjustment pins 10 abut against the side part of the spacer ring 8, the first lens 2 moves together with the spacer ring 8. As the first lens 2 moves, the optical axis $O_1$ of the first lens 2 aligns with the optical axis O of the lens optical system, whereby the optical axis adjustment of the first lens 2 is carried out.

Here, since the planar part 2a of the first lens 2 abuts against the holding surface 5a of the holding frame 4 whereas the holding surface 8a of the spacer ring 8 abuts against the planar part 3a of the second lens 3, the first lens 2 moves, as the adjustment pins 10 abut against the side part of the spacer ring 8, along the holding surface 5a and planar part 3a orthogonal to the optical axis O, thereby traveling in directions (indicated by arrows in FIG. 1) orthogonal to the optical axis O. Therefore, when moving the first lens 2, no postural shifts such as tilts with respect to the optical axis occur in the first lens 2, whereby appropriate optical axis adjustment is possible.

When the optical axis adjustment of the first lens 2 is completed, the end part of the holding frame 4 is inwardly deformed, so as to form a latching part 9. Since the latching part 9 is formed, the second lens 3 is latched in the holding frame 4 while being pressed toward the spacer ring 8. Also, since the latching part 9 is formed, the first lens 2 is held while being pressed against the holding surface 5a by way of the second lens 3 and spacer ring 8. The forming of the latching part 9 completes the making of the lens barrel 1.

According to the lens holding structure, as in the foregoing, the planar part 2a of the first lens 2 is caused to abut against the holding surface 5a of the holding frame 4 whereas the holding surface 8a of the spacer ring 8 is caused to abut against the planar part 3a of the second lens 3, whereby the first lens 2 can easily be moved together with the spacer ring 8 in directions orthogonal to the optical axis along the holding surface 5a and planar part 3a. Therefore, at the time of making and the like, the first lens 2 can be moved in directions orthogonal to the optical axis by pushing the outer peripheral part of the spacer ring 8 attached to the first lens 2 with the pins 10 and the like, whereby appropriate optical axis adjustment can be carried out without causing postural shifts such as tilts with respect to the optical axis in the first lens 2.

Also, since the latching part 9 formed by inwardly deforming an end part of the holding frame 4 is provided, the second lens 3 can be held by pressing it toward the spacer ring 8, whereby the first lens 2 can be pressed against the holding part 5 so as to be held thereby. Therefore, the attachment and holding of the first lens 2 and second lens 3 can easily be carried out, whereby the lens barrel 1 can efficiently be made.

Though the above-mentioned embodiment relates to a case where the lens support structure in accordance with the present invention is employed in the lens optical system of a camera, the lens support structure in accordance with the present invention is not limited thereto but may be employed in others as long as they support a lens.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A lens support structure comprising:

a first lens;

a second lens;

a spacer ring separating said second lens from said first lens and having a central axis; and a tubular holding frame having a central axis and accommodating said first lens and said second lens, wherein said holding frame has a flat first holding surface orthogonal to the central axis of said holding frame, said first lens has an optically functioning part having an optical axis and includes a first planar part orthogonal to the optical axis, said first lens being accommodated within said holding frame with said first planar part abutting said first holding surface, said spacer ring includes a flat second holding surface orthogonal to the central axis of said spacer ring, said spacer ring being attached to an outer periphery of said first lens so that said second holding surface faces said second lens, and said second lens has an optically functioning part having an optical axis and includes a second planar part orthogonal to the optical axis of said optically functioning part of said second lens, said second lens being accommodated within said holding frame with said second planar part abutting said second holding surface.

2. The lens support structure according to claim 1, wherein said holding frame includes a through hole penetrating through a peripheral face of said holding frame at a position outside said spacer ring.

3. The lens support structure according to claim 1, comprising latching means for latching said second lens by pressing said second lens toward said spacer ring, wherein said second lens is held pressed against said second holding surface by said latching means, and said first lens is held pressed against said first holding surface by said latching means by way of said second lens and said spacer ring.

4. The lens support structure according to claim 3, wherein said latching means includes an inwardly deformed end part of said holding frame.

* * * * *